(12) United States Patent
Seibold

(10) Patent No.: US 7,744,152 B2
(45) Date of Patent: *Jun. 29, 2010

(54) COLLAPSING TRUSS FOR A VEHICLE SEAT

(75) Inventor: Kurt A. Seibold, South Lyon, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/135,674

(22) Filed: Jun. 9, 2008

(65) Prior Publication Data

US 2008/0238170 A1    Oct. 2, 2008

Related U.S. Application Data

(63) Continuation of application No. 11/405,356, filed on Apr. 17, 2006, now Pat. No. 7,387,333.

(60) Provisional application No. 60/672,463, filed on Apr. 18, 2005.

(51) Int. Cl.
    *B60N 2/36*    (2006.01)
    *B60N 2/30*    (2006.01)

(52) U.S. Cl. .................. 297/15; 297/331; 297/334; 297/336; 297/378.12; 297/378.13

(58) Field of Classification Search .................. 297/15, 297/331, 334, 336, 378.12, 378.13
    See application file for complete search history.

(56) References Cited

U.S. PATENT DOCUMENTS

| | | | |
|---|---|---|---|
| 5,482,349 A * | 1/1996 | Richter et al. ................. 297/15 |
| 6,131,999 A * | 10/2000 | Piekny et al. ........... 297/378.12 |
| 6,234,553 B1 * | 5/2001 | Eschelbach et al. ....... 297/15 X |
| 6,513,875 B1 * | 2/2003 | Gray et al. ............. 297/378.12 |
| 6,578,919 B2 * | 6/2003 | Seibold et al. ............... 297/331 |
| 6,595,588 B2 * | 7/2003 | Ellerich et al. ............... 297/331 |
| 6,655,738 B2 * | 12/2003 | Kammerer ................... 297/331 |
| 6,805,408 B2 * | 10/2004 | Buhl et al. ................... 297/334 |
| 6,817,669 B2 * | 11/2004 | Roth et al. ............... 297/334 X |
| 6,902,236 B2 * | 6/2005 | Tame ...................... 297/331 X |
| 6,964,452 B2 * | 11/2005 | Kammerer ................... 297/331 |
| 7,029,063 B2 * | 4/2006 | Holdampf ..................... 297/15 |
| 7,387,333 B2 * | 6/2008 | Seibold ........................ 297/15 |
| 7,478,882 B2 * | 1/2009 | Fischer et al. ........... 297/378.12 |
| 2002/0067056 A1* | 6/2002 | Garrido et al. ................. 297/15 |
| 2004/0212237 A1* | 10/2004 | Epaud et al. ................. 297/331 |
| 2006/0061174 A1* | 3/2006 | Saberan ...................... 297/331 |

* cited by examiner

*Primary Examiner*—Rodney B White
(74) *Attorney, Agent, or Firm*—Foley & Lardner LLP

(57) ABSTRACT

A collapsing truss that completes a four-bar mechanism of a vehicle seat coupled to a vehicle floor. The vehicle seat includes a seat back coupled to a cushion structure via the collapsing truss which incorporates a pivot and a latch which engages on a pin. The collapsing truss includes a floor bracket coupled to the vehicle floor. A seat back bracket is coupled to the seat back and floor bracket. A cushion bracket is pivotally coupled to the cushion structure, the floor bracket, and the seat back bracket. The joints of the collapsing truss are defined by the seat back pivot, the cushion back/seat back bracket pivot, and the latch engagement pin. The seat back moves about the pivot when the collapsing truss operates.

19 Claims, 2 Drawing Sheets

US 7,744,152 B2

COLLAPSING TRUSS FOR A VEHICLE SEAT

CROSS-REFERENCE TO RELATED PATENT APPLICATIONS

This application claims the benefit of U.S. Utility patent application Ser. No. 11/405,356, filed Apr. 17, 2006, which claims the benefit of U.S. Provisional Application No. 60/672,463, filed Apr. 18, 2005 and is incorporated herein by reference.

FIELD OF THE INVENTION

The present invention relates generally to the art of vehicle seating, and more particularly to a collapsing truss that completes a four-bar mechanism of a vehicle seat.

BACKGROUND OF THE INVENTION

It is known in the art that vehicle seats are configured to fold for purposes of storage of the vehicle seat. Such storage increases the cargo carrying capability of the vehicle such as in an SUV or a van. Due to the type of packaging on many vehicles, there is a need for a seat back latch that minimizes the required packing environment when the seat is stored.

Thus, there is a need for a vehicle seat structure, when in a stowed condition that consumes no more space than a conventional seat. There is a further need for a collapsing truss that can be utilized in a bench seat, a 60/40% seat and a single seat, for example, bucket seat type seat.

SUMMARY OF THE INVENTION

There is provided a collapsing truss that completes a four-bar mechanism of a vehicle seat coupled to a vehicle floor. The vehicle seat includes a seat back coupled to a cushion structure via the collapsing truss which incorporates a pivot and a latch which engages on a pin. The collapsing truss includes a floor bracket coupled to the vehicle floor. A seat back bracket is pivotally coupled to the seat back and floor bracket. A cushion bracket is pivotally coupled to the cushion structure, the floor bracket, and the seat back bracket. The joints of the collapsing truss are defined by the seat back pivot, the cushion back/seat back bracket pivot, and the latch engagement pin. The seat back moves about the pivot when the collapsing truss operates. Another embodiment of the collapsing truss includes a second cushion bracket pivotally coupled to the floor bracket and the seat back bracket a spaced distance from the other cushion bracket. An additional embodiment of the collapsing truss provides that the seat back bracket is composed of at least two members.

There is also provided a vehicle seat for a vehicle having a floor. The vehicle seat comprises a seat cushion structure and a seat back which are coupled together by a collapsing truss. The collapsing truss is coupled to the seat cushion structure and the seat back, with the collapsing truss including a pivot and a latch which engages on a pin. The collapsing truss includes a floor bracket coupled to the vehicle floor. A seat back bracket is coupled to the seat back and the floor bracket. A cushion bracket is pivotally coupled to the cushion structure, the floor bracket, and the seat back bracket. The joints of the collapsing truss are defined by the seat back pivot, the cushion back/seat back bracket pivot and the latch engagement pin. The seat back moves about the pivot when the collapsing truss operates.

There is also provided a vehicle seat for a vehicle having a floor. The vehicle seat comprises a seat cushion structure, a seat back; and a collapsing truss which are coupled to the seat cushion structure and seat back. The collapsing truss includes a pivot and a latch which engages on a pin. The collapsing truss comprises a first means for coupling coupled to the vehicle floor, a second means for coupling pivotally coupled to the seat back and first means for coupling, and a third means for coupling pivotally coupled to the cushion structure, the first means for coupling and the second means for coupling. Wherein joints of the collapsing truss are defined by the seat back pivot, the second means for coupling/third means for coupling pivot, and the latch engagement pin, and wherein the seat back moves about the pivot when the collapsing truss operates.

DETAILED DESCRIPTION OF EXEMPLARY EMBODIMENTS

Figure 1:
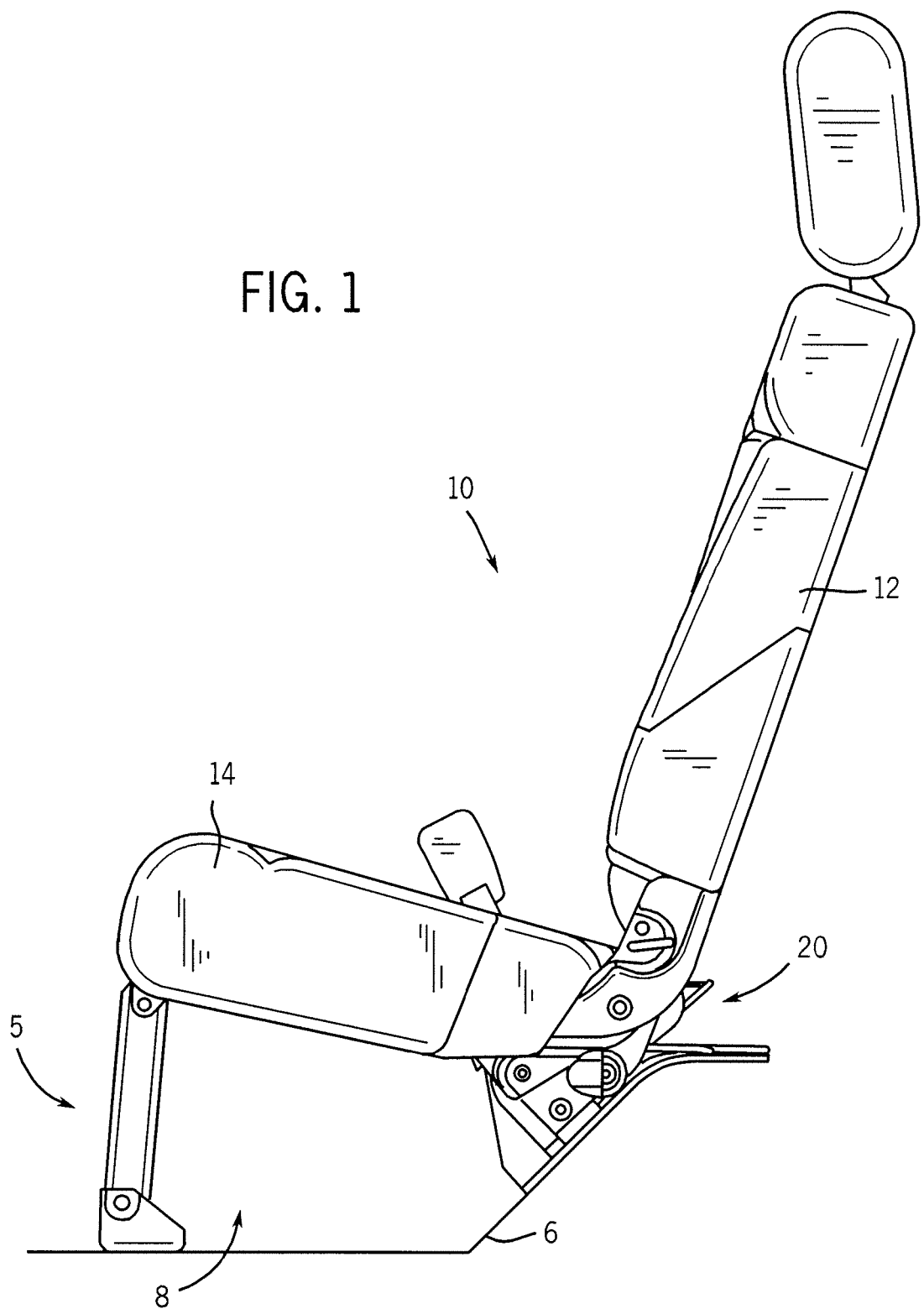
FIG. 1 is a side view of an exemplary embodiment of a vehicle seat including a collapsing truss coupling the seat back and the seat cushion structure to the vehicle floor.

Before beginning the description of exemplary embodiments of the present invention, several general comments can be made about the applicability and scope thereof.

First, while automotive seating may be referred to in the following portions of the specification, the invention is useful in all types of vehicle seating including, but not limited to automobiles, sport utility vehicles, vans, trucks, busses, and the like, where it is desirable to stow one seating component with respect to another.

Second, the following discussion and illustrations generally are directed to a seat back latch that minimizes the packaging environment when the seat is stowed. However, depending on the construction of the seat latch, and the recliner mechanism, other parts can be mechanically locked according to the scope and teaching of the specification. Furthermore, the components can be orientated other than as illustrated but still provide the operation of a stowable seat back apparatus for a vehicle seat as described herein.

Third, with respect to the materials for the construction of the collapsing truss, apparatus or vehicle seat, components, materials currently in use, such as steel or aluminum, are entirely appropriate as well as others selected by those skilled in the specification and materials for use in vehicle seating. Strength, welding capabilities, fabrication and adaptability would be factors considered by one skilled in the art seeking to adapt to the teachings of the present invention to a particular collapsing truss that completes a four-bar mechanism of the vehicle seat.

Fourth, it may be desirable to weld the collapsing truss to the vehicle seat, however, it should be understood that other means of fastening such as bolting or riveting or an appropriate adhesive (epoxy) can be utilized. However, any means of coupling the collapsing truss to a vehicle seat should be done to also minimize or eliminate BSR issues, as well as the need to precisely hold the relative position of the components for subsequent operation such as trim out and installation.

Fifth, for purposes of this disclosure, the term "coupled" means adjoining of two components (electric or mechanic) directly or indirectly to one another. Such joining may be stationary in nature or movable in nature. Such joining may be achieved with the two components (electric or mechanical) and any additional intermediate members being integrally formed as a single unitary body with one another or with the two components or the two components and any additional member being attached to one another. Such joining may be permanent in nature or alternatively may be removable or releasable in nature.

It should be understood that when referring to a direction such as forward or rearward, reference is being made to the general direction of the vehicle movement in relation to the driver. Also reference to a row of seats typically is the first row being the row in which the driver sits with subsequent rows identified consecutively.

Figure 2:
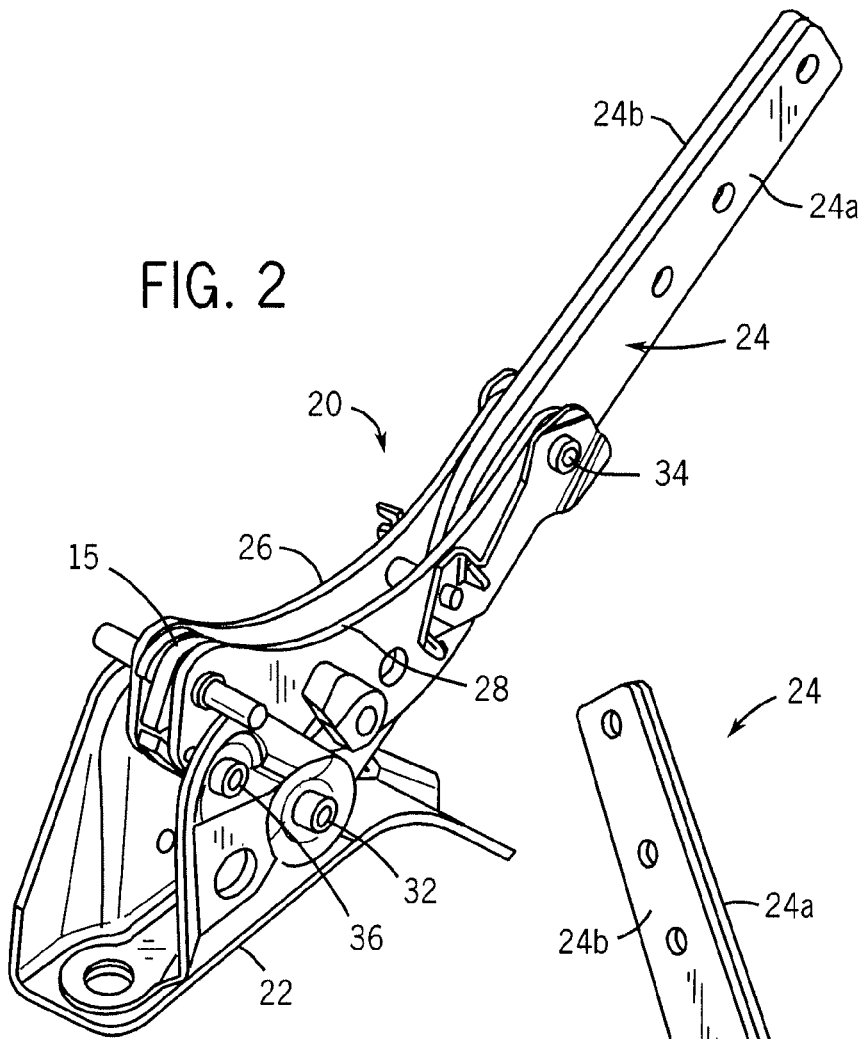
FIG. 2 is a perspective view of one side of an exemplary embodiment of a collapsing truss including a pivot and a latch.
Figure 3:
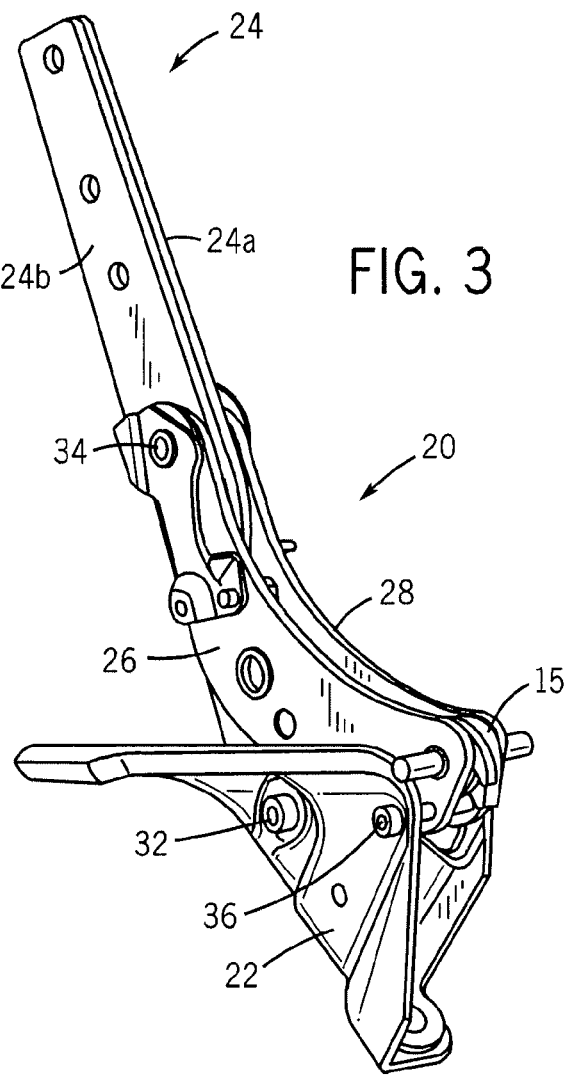
FIG. 3 is a perspective view of another side of the collapsing truss illustrated in FIG. 2.

Referring to the FIGS. 1-3, there is illustrated in FIG. 1, a vehicle seat 10 including a seat cushion structure 14 coupled to a seat back 12 with an exemplary embodiment of a collapsing truss 20. The vehicle seat 10 is coupled to the floor 6 of the vehicle 5. The vehicle seat 10 may include a seat control to adjust the seat in several configurations. The seat control may be manually operated or coupled to an actuator, for example, an electric motor. The vehicle seat 10 is coupled to the vehicle floor system 6 and may include a seat leg at the front of the seat cushion structure 14. A rail system may also be utilized to facilitate configuration of the vehicle seat 10.

Referring now to FIGS. 2 and 3, a collapsing truss 20 completes a four-bar mechanism 8 of the vehicle seat 10 coupled to the vehicle floor 6. The collapsing truss 20 incorporates a pivot 32 and a latch 15 which engages on a pin 36 to facilitate configuring of the vehicle seat 10.

The collapsing truss 20 includes a floor bracket 22 which is coupled to the vehicle floor 6. A seat back bracket 24 is coupled to the seat back 12 and the floor bracket 22. A cushion bracket 26 is pivotally coupled to the cushion structure 14, the floor bracket 22 and the seat back bracket 24. The joints of the collapsing truss 20 are defined by the seat back pivot 32, the cushion back/seat back bracket pivot 34 and the latch engagement pin 36. When the collapsing truss 20 operates, the seat back 12 moves about the pivot 34. The collapsing truss 20 is made up of three of the four bars in the vehicle seat 10. The three bars are the grounded floor bracket 22, the seat back 12 and the cushion structure 14. By locking the cushion structure 14 through the grounded floor bracket 22, a truss is created.

In another embodiment of the collapsing truss 20, a second seat cushion bracket 28 is pivotally coupled to the floor bracket 22 and the seat back bracket 24 a spaced distance from the other cushion bracket 26. The seat back bracket 24 may be composed of a single member, or may be composed of at least two members 24a and 24b as illustrated in FIGS. 2 and 3.

A suitable means of coupling the various components together may include pins, rivets, bolts and the like. Further, actuators may be coupled to the various members of the collapsing truss 20 to facilitate movement of the seat from its used position to a stowed position. Appropriate controls coupled to the actuators can be located adjacent to the vehicle seat 10 or at some other convenient location in the vehicle.

Thus there is provided a collapsing truss that completes a four-bar mechanism of a vehicle seat that minimizes the required packaging environment when the seat is stowed. However, it should be understood that the scope is not limited thereby. For example, while the illustrated and described embodiments refer to a collapsing truss being coupled to the seat cushion and seat back, the collapsing truss could also be coupled to a seat adjustment mechanism of the vehicle seat. Various modifications of components thereof are possible and will be readily identified by persons skilled in the art. The details of the disclosed collapsing truss, specified above, are only intended to illustrate and not to limit the present invention.

What is claimed is:

1. A collapsing truss for supporting a vehicle seat, the vehicle seat including a seat back coupled to a cushion structure, the collapsing truss comprising:
   a floor bracket configured to be fixed to a vehicle floor;
   a seat back bracket configured to be coupled to the seat back, wherein the seat back bracket is pivotally coupled to the floor bracket at a first pivot such that the seat back bracket is rotatable about the first pivot when the collapsing truss collapses; and
   a cushion bracket configured to be pivotally coupled to the cushion structure, wherein the cushion bracket is pivotally coupled to the seat back bracket at a second pivot such that the cushion bracket is rotatable about the second pivot and relative to the seat back bracket.

2. The collapsing truss according to claim 1, further comprising:
   a latch engagement pin fixed on the floor bracket; and
   a latch coupled to the cushion bracket for engaging and disengaging the latch engagement pin.

3. The collapsing truss according to claim 2, wherein joints of the collapsing truss are defined by the first pivot, the second pivot, and the latch engagement pin.

4. The collapsing truss according to claim 1, wherein the cushion bracket is a first cushion bracket, and wherein the collapsing truss further comprises a second cushion bracket pivotally coupled to the seat back bracket at the second pivot and at a spaced distance from the first cushion bracket.

5. The collapsing truss according to claim 1, wherein the seat back bracket comprises at least two members pivotally coupled to the floor bracket at the first pivot.

6. The collapsing truss according to claim 1, wherein the floor bracket, the seat back bracket and the cushion bracket are composed of metal.

7. The collapsing truss according to claim 6, wherein the metal is selected from a group consisting of steel, aluminum, and a combination of steel and aluminum.

8. The collapsing truss according to claim 1, wherein the collapsing truss is configured to complete a four-bar mechanism of the vehicle seat, wherein other members of the four-bar mechanism comprise the vehicle floor, the seat back, and the cushion structure.

9. A vehicle seat for a vehicle having a vehicle floor, comprising:
   a seat cushion structure;
   a seat back; and
   a collapsing truss for supporting the seat cushion structure, wherein the collapsing truss comprises:
     a floor bracket configured to be fixed to the vehicle floor;
     a seat back bracket coupled to the seat back, wherein the seat back bracket is pivotally coupled to the floor bracket at a first pivot such that the seat back bracket is rotatable about the first pivot when the collapsing truss collapses; and
     a cushion bracket pivotally coupled to the cushion structure,
   wherein the cushion bracket is pivotally coupled to the seat back bracket at a second pivot such that the cushion bracket is rotatable about the second pivot and relative to the seat back bracket.

10. The vehicle according to claim 9, further comprising:
    a latch engagement pin fixed on the floor bracket; and
    a latch coupled to the cushion bracket for engaging and disengaging the latch engagement pin.

11. The vehicle seat according to claim 10, wherein joints of the collapsing truss are defined by the first pivot, the second pivot, and the latch engagement pin.

12. The vehicle seat according to claim 9, wherein the cushion bracket is a first cushion bracket, and wherein the collapsing truss further comprises a second cushion bracket pivotally coupled to the seat back bracket at the second pivot and at a spaced distance from the first cushion bracket.

13. The vehicle seat according to claim 9, wherein the seat back bracket comprises at least two members pivotally coupled to the floor bracket at the first pivot.

14. The vehicle seat according to claim 9, wherein the floor bracket, the seat back bracket and the cushion bracket are composed of metal.

15. The vehicle seat according to claim 14, wherein the metal is selected from a group consisting of steel, aluminum, and a combination of steel and aluminum.

16. The vehicle seat of claim 9, further comprising an actuator coupled to one of the seat back and the seat cushion structure.

17. The vehicle seat of claim 16, wherein the actuator is an electric motor.

18. The vehicle seat of claim 9, wherein the collapsing truss completes a four-bar mechanism of the vehicle seat, wherein other members of the four-bar mechanism comprise the vehicle floor, the seat back, and the cushion structure.

19. The vehicle seat of claim 9, further comprising an actuator coupled to the collapsing truss for facilitating movement of the vehicle seat from a use position to a stowed position.

* * * * *